US009214183B2

(12) United States Patent
Van Rijnswou

(10) Patent No.: US 9,214,183 B2
(45) Date of Patent: Dec. 15, 2015

(54) SECURE STORAGE

(75) Inventor: Sander M. Van Rijnswou, Veldhoven (NL)

(73) Assignee: NXP B.V., Eindhoven (NL)

( * ) Notice: Subject to any disclaimer, the term of this patent is extended or adjusted under 35 U.S.C. 154(b) by 1369 days.

(21) Appl. No.: 12/602,500

(22) PCT Filed: Jun. 6, 2008

(86) PCT No.: PCT/IB2008/052234
§ 371 (c)(1),
(2), (4) Date: Dec. 1, 2009

(87) PCT Pub. No.: WO2008/152547
PCT Pub. Date: Dec. 18, 2008

(65) Prior Publication Data
US 2010/0199103 A1 Aug. 5, 2010

(30) Foreign Application Priority Data

Jun. 12, 2007 (EP) ..................................... 07110082

(51) Int. Cl.
G11B 20/00 (2006.01)
H04L 9/08 (2006.01)
H04L 9/32 (2006.01)

(52) U.S. Cl.
CPC ...... *G11B 20/00086* (2013.01); *G11B 20/0021* (2013.01); *G11B 20/00173* (2013.01); *G11B 20/00492* (2013.01); *G11B 20/00876* (2013.01); *H04L 9/0866* (2013.01); *H04L 9/3278* (2013.01); *G11B 2220/2537* (2013.01); *G11B 2220/60* (2013.01); *H04L 2209/60* (2013.01)

(58) Field of Classification Search
USPC ........... 380/1, 44, 54, 263, 286; 713/189, 193
See application file for complete search history.

(56) References Cited

U.S. PATENT DOCUMENTS

| 7,646,869 B2* | 1/2010 | Kurt et al. ....................... 380/54 |
| 2006/0209584 A1 | 9/2006 | Devadas et al. |
| 2008/0149700 A1* | 6/2008 | Tuyls et al. ................... 235/375 |

FOREIGN PATENT DOCUMENTS

| CN | 1922679 A | 2/2007 |
| WO | 2005/048256 A2 | 5/2005 |
| WO | 2005/086158 A1 | 9/2005 |
| WO | 2007/023420 A1 | 3/2007 |

OTHER PUBLICATIONS

Pappu Srinivasa Ravikanth; "Physical One-Way Functions"; MIT Thesis; Mar. 2001.
Tuyls, et al. "Information-Theoretic Security Analysis of Physical Uncloneable Funcations"; Philips Research Labs, Eindhoven, Netherlands; pp. 1-15 (Undated).

(Continued)

*Primary Examiner* — Beemnet Dada

(57) ABSTRACT

A system 100 for securely storing digital data includes a data storage 110 and a physical uncloneable function 120 (PUF), including an input (122) for receiving a challenge and an output (124) for producing a response to the challenge. Means 130 determine an identifier associated with the data storage. Means 140 supply a representation of the identifier to the PUF as a challenge and retrieve a corresponding response from the PUF. A cryptographic unit 150 performs a cryptographic operation for securing or verifying a digital content item stored in the data storage, where the cryptographic operation is performed under control of a cryptographic key derived from the received response.

20 Claims, 3 Drawing Sheets

(56) References Cited

OTHER PUBLICATIONS

Suh, et al. "AEGIS: A Single-Chip Secure Processor"; Information Security Technical Report (2005) 10; pp. 63-73.
Gassend, "Controlled Physical Random Functions"; Proceedings of the 18th Annual Computer Security Applications Conference (ASCA '02); pp. 149-160; see ISR.
Suh, et al. "Design and Implementation of the AEGIS Single-Chip Secure Processor Using Physical Random Funcations"; Proceedings of the 32nd International Symposium on Computer Architecture (ISCA '05), pp. 25-36 (Renumbered as 1-12); see ISR.
International Search Report for Application No. PCT/IB2008/052234 (Oct. 22, 2008).

* cited by examiner

SECURE STORAGE

FIELD OF THE INVENTION

The invention relates to a secure storage.

BACKGROUND OF THE INVENTION

Security in the context of digital data storage is still gaining importance. Was the subject at one time mainly relevant for computer servers, now its has spread via desktop PCs to all kinds of portable appliances, such as MP3 players, and mobile phones, as well as embedded storage devices, such as memory cards, USB keys, smart-cards, etc. At the same time the number of applications using data in the storage is increasing, as is the number of suppliers of the storage and/or applications. This makes it increasingly difficult to assess the security level. Against this background of an increasing number of different sensitive platforms running more and more software, the liabilities are increasing. In order to use any of the popular DRM (Digital Rights Managements) such as popular DRM applications like Windows Media DRM or Apples Fairplay, which are in use for music and/or video downloads a customer is bound to limitations, e.g. on which type or number of platforms the content may be rendered; a maximum duration for which the content may be rendered, restrictions on a number of copies that may be made, etc. A company that implements A DRM system may have to agree to robustness rules which typically demand minimum security levels, e.g. to ensure that the implementation can not be compromised with simple means. There can be stiff penalties for when security is broken.

One common problem in security sensitive applications is storage, such as magnetic storage (e.g. hard disk), optical storage (e.g. CD-type, DVD-Type, Blue Ray Disc-type, HD-DVD-type), electronic storage (e.g. Flash, M-RAMs, etc.). Some data needs to be stored persistently over longer periods of time. Yet the data in store may need to be protected against modification and/or reading. Traditionally, protective measures were built-in into the operating system and file system. Also in view of the fact that storage can be easily moved to platforms that do not obey such protective measures, cryptographic techniques are being applied to gain authenticity and/or confidentiality. The cryptographic techniques require cryptographic keys. Typically, a so-called master key is used from which a specific key can be derived for several applications, such as authentication or decryption/descrambling, or for several uses, e.g. different encryption of private information for specific purposes, or of different files or even of different records in a database, etc. Using keys in the conventional way introduces the risk that the keys may be found by reverse engineering, or cloning. Frequently, the secret cryptographic keys are embedded in the binary image of the computer program (application) that needs the secure store and encrypt and/or authenticate with that key. A particular risk occurs in systems where the cryptographic process is executed on a conventional processor. In such systems a representation of the key may be present in the main memory (typically RAM) in a plain (unencrypted/unprotected) form. Effort is being made to obfuscate such keys. However, obfuscating usually involves a significant adjustment of the current applications.

Recently, so-called Physical Uncloneable Functions (PUFs) were introduced by Pappu "Physical One-Way Functions" MIT, March 2001 as a cost-effective way of generating secure keys for cryptographic purposes. PUF are described for use as a hash function and for authentication purposes. Because through PUFs the data is stored essentially in a material rather than in a circuit, the technology can also be used as part of a device that needs authentication, such as a security sensor. Many further developments focus on developing different types of PUFs. The application of PUFs focuses on using PUFs as unique identifiers for smart-cards and credit cards or as a 'cheap' source for key generation (common randomness) between two parties, see P. Tuyls e.a. "Information-Theoretic Security Analysis of Physical Uncloneable Functions", based on the very useful properties of PUF of the uniqueness of the responses and uncloneability of the PUF.

The approach indicated above of having the operating system keep the access to the data restricted only to the entities with some attributes (such as applications of the current user) has the problem that the user is vulnerable if bugs in the operating system are found, if other applications with the same privilege can have access to the data, or if the application that wrote the data in the first place can be changed to subvert the data. It is especially the last item that is particularly worrisome. On the Internet patches are distributed with which an application can be changed to circumvent certain restrictions. Especially in the gaming area this is very common.

Finally a problem with a secure storage is cloning the store. By copying a store from one device to another the user may get the same privileges as the original owner of the store.

SUMMARY OF THE INVENTION

It would be advantageous to provide a system and method of the kind set forth with enhanced security at low complexity.

To better address this concern, in a first aspect of the invention the system for securely storing digital data includes:

a data storage;

a physical uncloneable function, hereinafter referred to as PUF, including an input for receiving a challenge and an output for producing a response to the challenge;

means for determining an identifier associated with the data storage;

means for supplying a representation of the identifier to the PUF as a challenge and retrieving a corresponding response from the PUF;

a cryptographic unit for performing a cryptographic operation for securing or verifying a digital content item stored in the data storage, where the cryptographic operation is performed under control of a cryptographic key derived from the received response.

According to the invention, a PUF is used to generate the cryptographic key. The input to the PUF is associated with the data storage. As such, the PUF binds the cryptographic key to the data storage. Since the PUF is uncloneable, cloning of content stored in the data storage becomes useless. The cryptographic operations on the cloned content item will not produce the desired result without the original PUF. The cryptographic operation may be any cryptographic operation, preferably authentication or encryption/decryption.

In an embodiment, the identifier fed to the PUF is derived from the data storage itself (e.g. a storage identifier), the user of the system (e.g. user name, and/or password), or the content item (e.g. an identifier of the digital content item, such as a file name; an identifier of a record of the digital content item; or the digital content item itself).

In an embodiment, the cryptographic unit includes a processor and the system includes a computer program for causing the processor to perform at least part of the cryptographic operation; the identifier being derived from at least a representation of the computer program. By deriving the identifier at least partly from the program, the PUF is bound to the application itself. This makes cloning or tempering with the program much more difficult. The program may be an application program but may also be the operating system or part of the operating system.

In an embodiment, the system includes means for calculating a hash of the identifier associated with the data storage and using the hash as the representation supplied to the PUF. By using a hash, the identifier can be strongly bound to more digital information, such as the entire digital content or the entire application program. This makes it difficult to modify even a small part of the content or application program.

In an embodiment, the system includes a plurality of applications; each application using an associated digital content item stored in the data storage and each application being arranged to perform a cryptographic operation for securing or verifying security of the associated digital content item under control of a cryptographic key; the identifier associated with the data storage being derived from at least the application and/or the digital content item associated with the application such that the identifier is unique for the application. Each application may operate on respective content items but may also work on the same content items. According to the invention, for each application a unique identifier is fed to the PUF, resulting in a unique cryptographic key. As such, if one key is broken the remainder of the system is unaffected, since a key does not reveal any information on the PUF itself. In traditional systems one master key is used from which application-specific keys are derived. Breaking one of the application-specific keys reveals information on the master key which weakens the system.

In an embodiment, the PUF is physically integrated with the data storage. By physically integrating the PUF with the storage, a physical link is established strengthening the bond between the key generated by the PUF and the storage.

In an embodiment, the data storage is of an optical type, the PUF is of an optical type, and the PUF is integrated in an optical carrier of the data storage. An optical PUF has good cryptographic characteristics and can be integrated in a transparent optical substrate as is used for optical storage. This integration establishes a strong physical relationship between the PUF and the storage and achieves a very secure PUF.

In an embodiment, the data storage is implemented on a semiconductor device and the PUF is integrated on the semiconductor device. By integrating the PUF into the semiconductor device, a cost-effective and strong-binding is achieved. In a further embodiment, the PUF is of an optical type or an electronic type. Using an electronic PUF is very cost-effective, since this requires no additional processing steps. Using an optical PUF integrated in the semiconductor device gives a strong protection.

These and other aspects of the invention are apparent from and will be elucidated with reference to the embodiments described hereinafter.

DETAILED DESCRIPTION OF EMBODIMENTS

Figure 1:
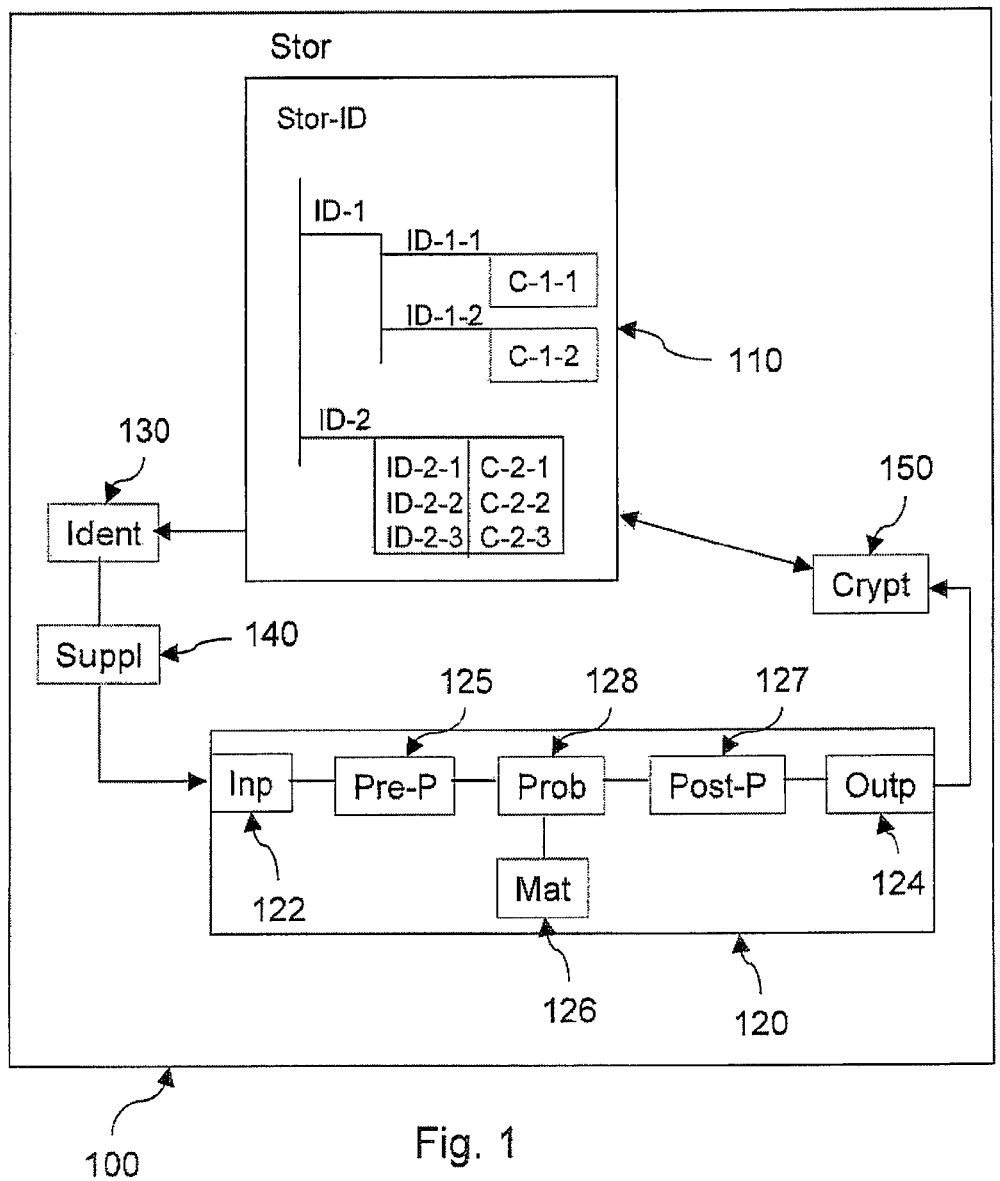
FIG. 1 shows a block diagram of an exemplary system in which the invention may be used.

Where in the Figures same reference numerals are used, they represent the same functionality, unless specified differently. The invention relates to using a 'Physical Uncloneable Function' (PUF) for securing data stored in a data storage. Although a relatively recent development in cryptography, in itself, PUFs are known. A PUF can be seen as a function that is realized by a physical system, such that the function is easy to evaluate but the physical system is hard to characterize. PUFs were introduced by Pappu as a cost-effective way of generating secure keys for cryptographic purposes. A PUF comprises a physical object that is inherently uncloneable (since it contains many uncontrollable ("random") parameters during production of the object). When a stimulus (usually called challenge) is applied to the object, it reacts with a response that can be measured. This challenge-response behavior characterizes the structure completely. Furthermore the structure is tamper-evident, meaning that if the structure is physically damaged (by an attack), its challenge-response behavior changes noticeably.

By using storing a PUF to represent a cryptographic key, the key becomes uncloneable. Hence, it cannot be given away or copied. A PUF is a physical system designed such that it interacts in a complicated way with stimuli (challenges) and leads to unique but unpredictable responses. Hence, a PUF is similar to a keyed hash function, where the material plays the role of the key. In order to be hard to characterize, the system should not allow efficient extraction of the relevant properties of its interacting components by measurements. Physical systems that are produced by an uncontrolled production process, i.e. one that contains some randomness, turn out to be good candidates for PUFs. Because of this randomness, it is hard to produce a physical copy of the PUF. Furthermore, if the physical function is based on many complex interactions, then mathematical modelling is also very hard. These two properties together are referred to as Uncloneability.

FIG. 1 shows a block diagram of an exemplary system 100 in which the invention may be used. The system is used for securely storing digital data. The data itself includes at least one content item that may take any form, such as documents (e.g. produced by word processing, a spreadsheet, presentation), programs (e.g. in source code, executable form or interpretable form, such as Java), digital audio (e.g. content items in MP3, WMA, AAC format, etc.), still images, video, etc. The data may also be very small, such as information stored in a smart card. A content item can then be the information required for one specific application that uses the data. For example, the smart-card may contain a respective content item (or set of content items) for a bank, shops, petrol stations, etc. The system 100 includes a data storage 110. The data storage may take any suitable form, such as a hard disk, optical storage (e.g. of the CD, DVD, Blue Ray Disc, or HD-DVD families), or be embedded in a semiconductor device (e.g. Flash, MRAM, smart-card, etc.). The system 100 further includes a physical uncloneable function (PUF) 120. The PUF 120 includes an input 122 for receiving a challenge and an output 124 for producing a response to the challenge. Clearly, the PUF also contains physical material 126 with "random" characteristics inherent in the physical properties of the material or physical/chemical process of producing the material. The PUF also contains a probe 128 for, in dependence on the values received via the input 122, measuring/sensing properties of the material 126. The PUF itself is not the subject of the inventions. In principle, any suitable PUF may be used. The PUF may also contain a pre-processing unit 125 and a post-processing unit. The pre-processing unit 125 may, for example, perform a hashing operation on the received input. The output of the hashing operation (hash) is then supplied to the probing unit 128. The post-processing unit 127 may perform a post-processing on the output of the probe 128. For example, if the probe provides useful information mixed with bits that have no information (e.g. a lot of 'zero' bits), a hash may be used to condense the output. It is also well-known that the probe is subject to noise. The response generated by the probe may be slightly different on each evaluation even for exactly the same challenge (input). It is known to 'filter-out' such noise using error-correcting codes. Block 127 can perform such filtering based on helper-data that may be stored in a memory (not shown) in the PUF 120.

The system 100 further includes means 130 for determining an identifier associated with the data storage. Any suitable means may be used for this end. In an embodiment, the identifier is derived from at least one of the following:

the data storage itself. For example a storage identifier (Stor-ID in FIG. 1) may be read from the storage, using conventional means to read data from the storage. Preferably, the identifier is stored in a way not directly readable in plain form by a conventional program. For example, the identifier may be stored in sectors of a storage medium that are only accessible via secure functions of an operating system; the identifier may also be stored in an obfuscated form (using any suitable obfuscating function) or stored in an encrypted form.

an user of the system. For example a user name, and/or password or the user may be used. The identifying information of the user may be the same as used by an operating system of a computer. Also special techniques, such as biometry, may be used to retrieve the user identity in a secure form.

the digital content item. For example, an identifier of the digital content item, such as a directory name (e.g. ID-1 in FIG. 1) or a file name (e.g. ID-1-1, ID-1-2, ID-2), may be used. Also an identifier of a part, such as a record identifier such as a name of a field in a database (e.g. illustrated as ID-2-1, ID-2-2, ID-2-3), of the digital content item (e.g. C-2-1, C-2-2, C-2-3, respectively) may be used). The identifier may also be derived directly from the digital content item itself or part of the digital content item, e.g. by using a hash of the (part of the) digital content item as the identifier.

The system further includes means 140 for supplying a representation of the identifier to the PUF as a challenge and retrieving a corresponding response from the PUF and a cryptographic unit 150 for performing a cryptographic operation for securing or verifying security a digital content item stored in the data storage, where the cryptographic operation is performed under control of a cryptographic key derived from the received response. Means 140 may be implemented in a very straight-forward form, for example in hardware by simply connecting the output of the means 130 to the input 122 of the PUF and connecting the output 124 of the PUF to the cryptographic unit 150. The cryptographic unit 150 may perform any cryptographic techniques that increases the security of content items stored in storage 110.

The system according to the invention may be used for storing (writing) content items to the data storage 110, reading content items from the data storage 110 or both. Preferably, the cryptographic operation is at least one of:

authenticating, e.g. a cryptographic digital signature is stored in the data storage for later verification. This operation is particularly useful for a writing operation.

verifying authentication, e.g. the signature is read and verified. This operation is particularly useful for subsequent reading of a content item or for first verifying the data storage and then performing a writing operation.

encrypting. This operation is particularly useful for writing a content item in encrypted form.

decrypting. This operation is particularly useful for reading an encrypted content item followed by decrypting the read content item.

In itself any suitable forms of the authentication and encryption/decryption may be used.

As is known, a PUF can generate a cryptographic key. As such the output (response) of the PUF can be fed directly to the cryptographic unit 150. If so desired, first certain operations may be performed on the response before supplying it to the cryptographic unit 150, such as combining the response with other key-like data and/or performing a conventional hash on the response. Such post-processing may be performed by unit 127.

According to the invention, the data in the storage 110 is now secured through the cryptographic unit 150 and the storage 110 is linked to a hard property embedded in the hardware through the PUF. The output of the PUF is used for the cryptographic securing, where the input of the PUF is associated with the storage. In this way some of the known attacks can now be avoided or made more difficult. In particular cloning attacks can be avoided (because the PUF cannot be copied, the store cannot be copied either). The system can also be described better in qualitative terms, and is thus better suited for evaluations.

Figure 2:
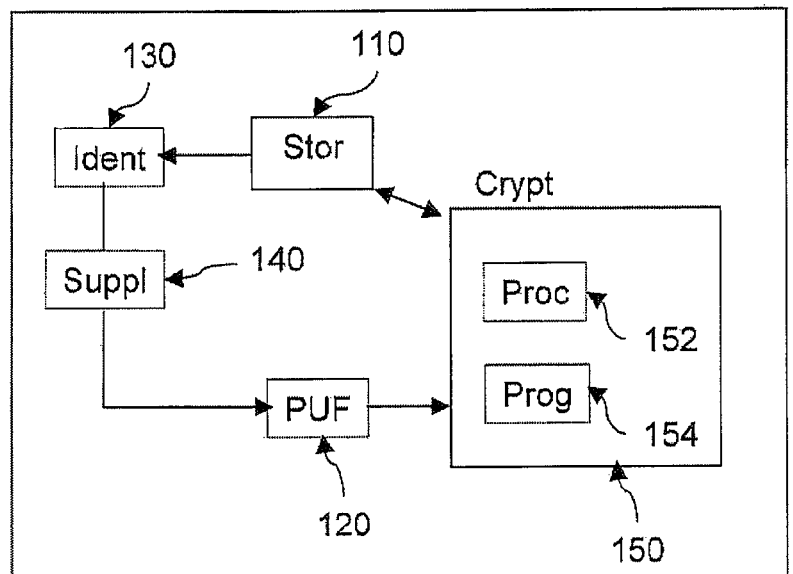
FIG. 2 shows a block diagram of an embodiment wherein the PUF is used to bind the storage to a program.

In a preferred embodiment as shown in FIG. 2, the cryptographic unit 150 includes a processor 152. The processor may be of any suitable type, for example a conventional PC-type of processor, an embedded microcontroller, or a VLIW (e.g. for performing cryptographic or signal processing operations on streaming digital content). The system 100 also includes a computer program 154 for causing the processor 152 to perform at least part of the cryptographic operation. Preferably, the computer program is stored in the data storage 110. During execution it is then loaded into a memory (not shown), such as RAM, of the cryptographic unit 150. In this embodiment, unit 130 derives the identifier from a representation of the computer program 154. The unit 130 may also use other inputs associated with the data storage 110 to determine the identifier. In this way, the actual cryptographic unit 150 is bound to the storage through the program. Tampering with the program 154 can now result in changing the identifier. As a consequence, the challenge to the PUF 120 is changed and the cryptographic key used by program 154 will be different. Decryption/checking the authenticity will now result in errors. Preferably, the identifier depends on a representation of the storage (such as storage identifier like Stor-ID), content to be secured (such as a content identifier or part of the content) and the program that performs the cryptographic operation. A composite identifier can be made by simply concatenating such sub-identifiers. The program may be an application program, such as a media player. Instead or additionally the program may also represent the operating system or a part of the operating system involved in the cryptographic operation. For example, Dynamic Link Libraries (DLLs) or other forms of codecs may loaded in an operating system. Preferably, such security sensitive program parts are secured using the PUF according to the invention.

Figure 3:
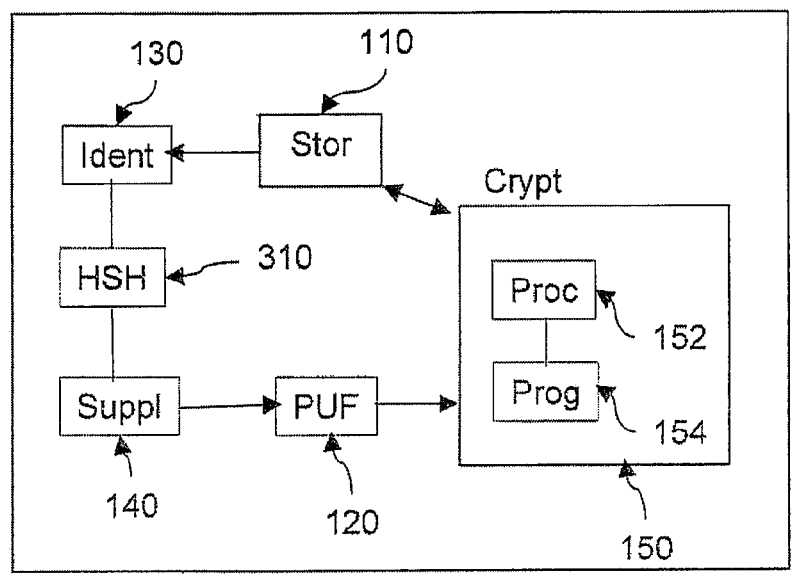
FIG. 3 shows a block diagram of a further embodiment wherein a hash is used.

In a further embodiment, as shown in FIG. 3 the system includes means 310 for calculating a hash of the identifier associated with the data storage and using the hash as the representation supplied to the PUF. Advantageously, the hash is used to ensure that the identifier (and thus the security) depends on a large amount of digital data. For example, referring to the embodiment of FIG. 2 the hash may be calculated over the entire program 154 (or at least the part that performs the cryptographic operation). The hash may be calculated using any mathematical hash, such as SHA-256 or SHA-512.

Figure 4:
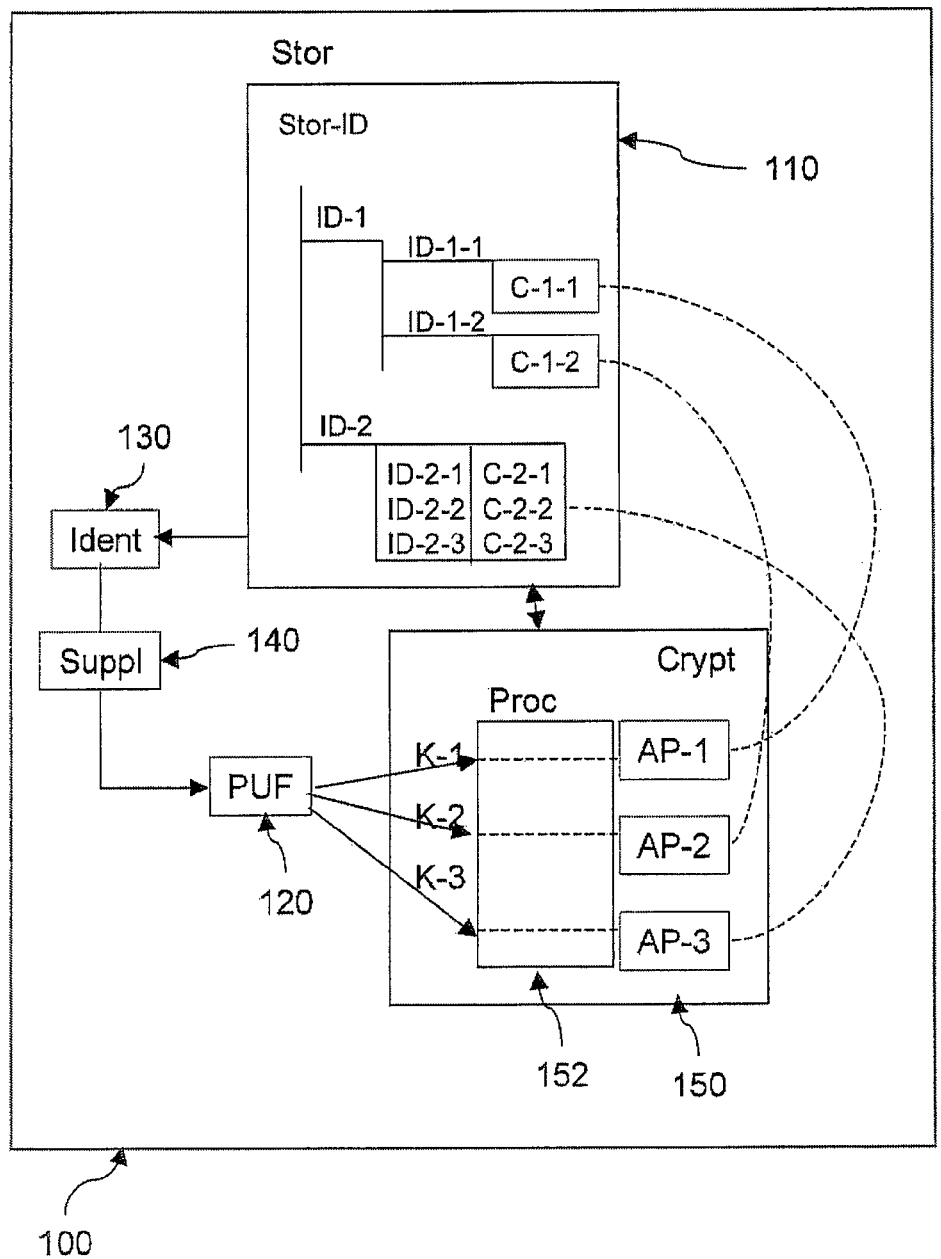
FIG. 4 shows a further embodiment wherein the binding is application-specific.

In a further embodiment, the system includes a plurality of applications, typically implemented as computer programs. FIG. 4 shows an embodiment where the applications AP-1, AP2, and AP-3 are stored in the data storage 110, but during execution are loaded in the cryptographic unit 150. Each of the applications AP-1, AP-2, and AP-3 uses an associated digital content item stored in the data storage, shown as C-1-1, C-1-2 and C-2-1 to C-2-3, respectively. Each application is arranged to perform a cryptographic operation for securing or verifying the security of the associated digital content item under control of a respective cryptographic key K-1, K-2, K-3. The identifier associated with the data storage is derived from at least the application and/or the digital content item associated with the application such that the identifier is unique for the application. FIG. 4 shows an exemplary block diagram based on FIG. 2. It will be appreciated that the embodiment may also be used in combination with the embodiment of FIG. 3.

In a preferred embodiment, the PUF 120 is physically integrated with the data storage 110. The integration is preferably in an inseparable way, meaning that the PUF gets damaged if an attacker attempts to remove the PUF. This makes the data storage in which the PUF is embedded uniquely identifiable and uncloneable.

Advantageously, the data storage 110 is of an optical type (e.g. CD, DVD, HD-DVD, or Blue-Ray Disc family) and the PUF is of an optical type. In this embodiment, the PUF is integrated in an optical carrier of the data storage 110. A separate probe may be added to scan the PUF. Also the existing laser for reading the data from the optical storage may be used for probing the PUF. The PUF originally developed by Pappu is of an optical type. Optical PUFs consist of a physical structure containing some scattering material which is randomly distributed. They exploit the uniqueness of speckle patterns that result from multiple scattering of laser light in this disordered optical medium. The input ('challenge') can be e.g. the angle of incidence, focal distance or wavelength of the laser beam, a mask pattern blocking part of the laser light, or any other change in the wave front. The output may be the speckle pattern. Physical copying is difficult for two reasons: (i) the light diffusion obscures the locations of the scatterers (ii) even if all scatterer locations are known, precise positioning of a large number of scatterers is very hard and expensive, and requires a production process different from the original randomized process.

Several improvements have been developed so-far, resulting in second generation optical PUFs becoming available.

In an alternative embodiment, the data storage is implemented on a semiconductor device, such as an integrated circuit (IC). The data storage may for example be a non-volatile memory (e.g. SRAM), volatile memory (e.g. Flash memory), or smart-card with memory. In this embodiment, the PUF is also integrated in the same semiconductor device. The PUF may be of any type that can be integrated with an electronic device. Optical types of PUFs are being developed that are implemented using semiconductor technology and can be integrated with electronic circuits. For example, PUFs are being developed using semiconductor LEDs as probes. Alternatively, PUFs may be used that are of an electronic type. Several of such PUFs are being developed currently. For example, where the PUF is based on inherent differences in resistance or capacitance of an etched circuit (e.g. measured in delay lines in the IC), inherent differences in an initial state of an electronic memory (e.g. SRAM start-up noise), inherent differences in separate coatings provided on the IC, e.g. in the form of random patterns of particles with electrical properties in the coating or difference in capacitance of the coating, or based on production variation in the properties of logical gates (flip-flop PUF). An example of silicon PUF is described by G. Edward Suh e.a. "Aegis: A single-chip secure processor", Information Security Technical report (2005) 10, 63-73, Elsevier.

Products in which this invention can be used include mobile phone, set-top boxes, game consoles, personal computers, servers, and routers, but also smart-cards. The secure storage according to the invention may be used for digital rights management, access controls, privacy measures, protection of user data, etc.

It will be appreciated that the invention may be implemented in hardware component as well as in software, for example on a Digital Signal Processor (DSP) or optimized VLIW processors. For software implementation, the blocks described in the Figures can be seen to represent functional software units. The invention thus also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for storing digital data, the system comprising:
a data storage unit;
a physical uncloneable function (PUF) unit comprising an input for receiving a challenge and an output for producing a response to the received challenge;
an identification unit that determines an identifier associated with the data storage unit;
a representation unit that supplies a representation of the determined identifier to the PUF unit as the challenge and retrieving a corresponding response from the PUF unit, wherein the data storage unit is linked to a hard property embedded in hardware through the PUF unit;
a cryptographic unit that performs a cryptographic operation for at least one of securing and verifying a digital content item stored in the data storage unit, wherein the cryptographic operation is performed under control of a cryptographic key derived from the retrieved response.

2. The system as in claim 1, wherein the cryptographic operation is authenticating.

3. The system as in claim 1, wherein the identifier is derived from the data storage unit.

4. The system as in claim 1, wherein the cryptographic unit includes a processor, the system further comprises a computer program for causing the processor to perform at least a part of the cryptographic operation and the identifier is derived from at least a representation of the computer program.

5. The system as in claim 1, further comprising
a calculation unit for calculating a hash of the identifier associated with the data storage unit and using the hash as the representation supplied to the PUF unit.

6. A system for storing digital data, the system comprising:
a data storage unit;
a physical uncloneable function (PUF) unit comprising an input for receiving a challenge and an output for producing a response to the received challenge;
an identification unit that determines an identifier associated with the data storage unit;
a representation unit that supplies a representation of the determined identifier to the PUF unit as the challenge and retrieving a corresponding response from the PUF unit, wherein the data storage unit is linked to a hard property embedded in hardware through the PUF unit;
a cryptographic unit that performs a cryptographic operation for at least one of securing and verifying a digital content item stored in the data storage unit, wherein the cryptographic operation is performed under control of a cryptographic key derived from the retrieved response; and
a plurality of applications; each said application using an associated digital content item stored in the data storage unit and being arranged to perform a cryptographic operation for one of securing and verifying security of the associated digital content item under control of the cryptographic key; the identifier associated with the data storage unit being derived from at least one of the application and the digital content item associated with the application such that the identifier is unique for the application.

7. The system as in claim 1, wherein the PUF unit is physically integrated with the data storage unit.

8. The system as in claim 7, wherein the data storage unit is of an optical type, the PUF unit is of an optical type, and the PUF unit is integrated in an optical carrier of the data storage unit.

9. The system as in claim 7, wherein the data storage unit is implemented on a semiconductor device and the PUF unit is integrated on the semiconductor device.

10. The system as in claim 9, wherein the PUF unit is of an electronic type.

11. A storage device for use in a system as in claim 1, wherein the PUF unit is physically integrated with the data storage unit.

12. A method of storing digital data in a data storage unit, the method comprising;
determining an identifier associated with the data storage unit;
supplying a representation of the determined identifier as a challenge to a physical undone able function (PUF) unit, wherein the data storage unit is linked to a hard property embedded in hardware through the PUF unit;
retrieving a corresponding response from the PUF unit; and
performing a cryptographic operation for at least one of securing and verifying a digital content item stored in the data storage unit, wherein the cryptographic operation is performed under control of a cryptographic key derived from the received response.

13. The system of claim 1, wherein the identifier is derived from a user of the system.

14. The system of claim 1, wherein the identifier is derived from the digital content item.

15. The system of claim 1, further comprising:
a pre-processing unit.

16. The system of claim 1, further comprising:
a post-processing unit.

17. The system of claim 1, further comprising:
a probing unit.

18. The system of claim 1, wherein the cryptographic operation is verifying authentication.

19. The system of claim 1, wherein the cryptographic operation is encrypting.

20. The system of claim 1, wherein the cryptographic operation is decrypting.

* * * * *